A. POLLAK.
DEVICE FOR THE PHOTOGRAPHIC REGISTRATION OF VIBRATIONS IN LINE FORM.
APPLICATION FILED JAN. 29, 1913.
1,092,594.
Patented Apr. 7, 1914.
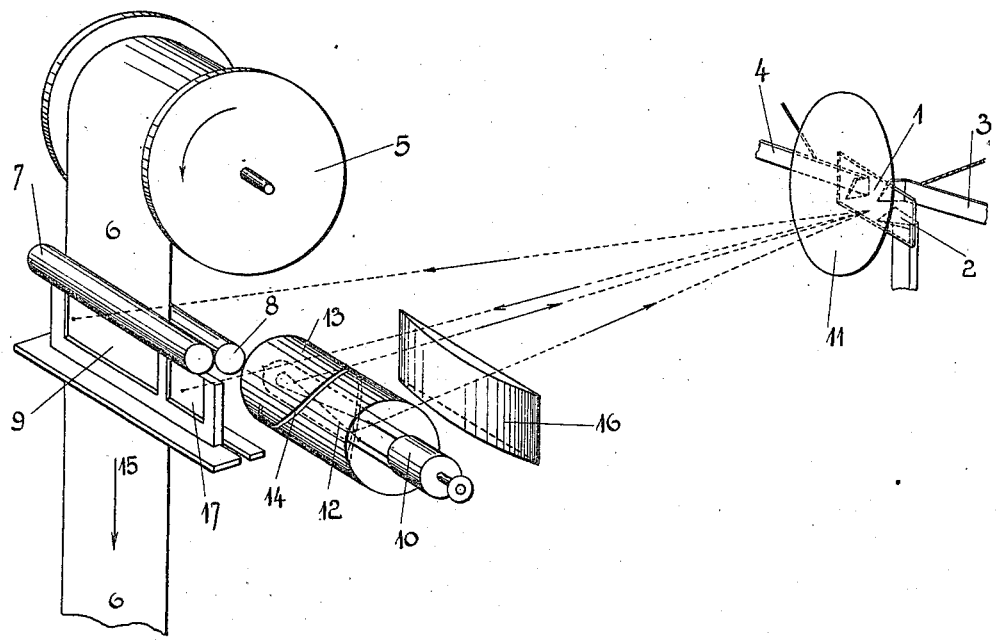
WITNESSES:
INVENTOR:
Anton Pollak
By Attorneys,

UNITED STATES PATENT OFFICE.

ANTON POLLAK, OF PARIS, FRANCE.

DEVICE FOR THE PHOTOGRAPHIC REGISTRATION OF VIBRATIONS IN LINE FORM.

1,092,594.  Specification of Letters Patent.  Patented Apr. 7, 1914.

Application filed January 29, 1913. Serial No. 744,851.

*To all whom it may concern:*

Be it known that I, ANTON POLLAK, a subject of the King of Hungary, residing in Paris, France, have invented certain new and useful Improvements in Devices for the Photographic Registration of Vibrations in Line Form, of which the following is a specification.

The invention starts from the system of photographic registrations of vibrations in line form which has become known through the Pollak-Virag rapid telegraph, in which the vibrations are transmitted through one or through two telephones traversed by suitable current combination to a mirror in such a manner that the rays from a point of light fall upon the mirror and are reflected therefrom and received upon a light-sensitive paper strip in such a way for example that certain lines show a directly readable script.

The invention renders it possible to attain in exactly horizontal and somewhat drawn-out linear form a registration far exceeding in sharpness that which has been previously possible. Moreover the device in accordance with the invention makes it possible to directly and clearly observe the entire operation so that any disturbances can be immediately recognized and corrected.

In the accompanying drawing the subject matter of the invention is illustrated in one embodiment in diagrammatic perspective view.

The mirror, 1, which rests freely rotatable upon the stationary point, 2, is in the well known manner moved by leaf springs, 3, and 4, each of which by means of a small rod is directly under the control of a telephone member. From the one telephone there arise horizontal movements and from the other vertical movements, and as a matter of fact the mirror rotates under the action of the spring, 3, about a horizontal axis and under the action of the spring, 4, about a vertical axis; by the compounding of horizontal and vertical components we can, as is well known, obtain any desired form of character.

The light-sensitive paper, 6, designed for registering is conducted from the drum, 5, between the rollers, 7 and 8, to the illuminated point 9. For illuminating the mirror the lamp, 10, or any other light restricted to linear shape serves. The illuminating filament, 12, of the tubular shape incandescent lamp, 10, is surrounded by an opaque cylinder, 13, for example, of metal, which is provided with a small slit 14.

The small portion of the filament shining outward through the slit can by means of the objective, 11, be represented as a point of light which after reflection by the mirror, 1, registers upon the sensitive paper, 6, the movements of the mirror. In order to be able to receive the registration in linear form upon a wide strip of paper there must be given to the point of light upon the paper, 6, at the point of illumination, 9, a movement corresponding to that given to the lines by the paper. That is to say, the point of light must not only move transversely across the paper but must have also a slight longitudinal movement corresponding to the movement of the paper. For this purpose in the well known manner in the metal cylinder, 13, there is fastened the small slit, 14, in the form of a screw-thread and the metal cylinder, 13, is rotatably arranged. If now the metal cylinder is rotated then a portion of the filament, 12, progressing from one end to the other will constantly illuminate the mirror, and the registered point of light is displaced and writes a line which as soon as the end of the screw-shape slit comes between the filament 12 and mirror, 1, is interrupted whereupon on further rotating the commencement point of the same located at the other end of the screw-thread, 14, allows the light of the filament, 12, to fall upon the mirror whereupon the point of light begins a new line. The length of a line is accordingly determined by the difference which results from those successive registering points of the incandescent filament which corresponds to the two end points of the screw-shape slit.

The portrayed point of light shows as a rectangle the height of which is determined by the thickness of the illuminating filament, while the width results from the width of the screw-shape slit, 14. Now the illuminating filament, 12, is necessarily farther removed from the objective, 11, than the position of the slit in the cylinder, 14, and this lies between the filament and the objective. It follows therefrom that the one limitation of the light point, in the direction of the thickness of the filament falls away farther from the objective than the other limitation, in the direction of the width of the slit, so that the two limitations lie in different planes and consequently also the corresponding representations of the picture portions arising from various planes do not fall exactly in the same plane and make impossible a sharp representation. This makes itself especially noticeable if the script itself is enlarged, since the defects in consequence of unsatisfactory sharpness of the copy of the light point in this case stand forth still more plainly. An approximate correction of this difficulty consists in striving to bring the illuminating filament inclosed in the incandescent lamp as near as possible to the glass of the lamp in the direction of the mirror in order to make as small as possible the difference between the two distances. A perfectly sharp point of light cannot be attained in this way, and there arises also a further disadvantage that the inner wall of the lamp in the vicinity of the glowing filament becomes exceedingly blackened and in fact in consequence of the excessive nearness of the filament gets black so rapidly that the lamp must be exchanged after a very short burning period. This disadvantage is materially remedied by the present invention by arranging in the vicinity of the screw-shape slit, 14, between the source of light and the objective a cylindrical lens, 16, which causes the light rays to be refracted only in the direction of the width of the slot while in the direction of the thickness of the filament they experience no change. This cylindrical lens allows of bringing into the same plane, and thereby attaining a sharp point of light upon the paper, 6, the points which are to be registered arising from various planes and which, as mentioned, would fall in different copying planes if there were no rectification. This rectification can at will be effected by means of concave or convex cylindrical lenses; it is, however, advantageous to employ convex lenses for a purpose hereinafter explained.

It is in fact desirable to obtain the registration in the longest possible lines. The length of the lines depends principally upon the pitch of the screw-shape slit 14. This pitch is however limited since the diameter of the rotating cylinder, 13, is limited and the slit under increasing pitch soon becomes oblique to such an extent that the sharpness of the point of light suffers therefrom.

An enlargement of the lines (without increasing the sharpness) is attainable in accordance with the invention by arranging between the slit, 14, and the objective, 11, a convex lens which causes an enlarged image of the line to appear on the paper, 6. Since however this enlargement is only desired in the direction of the movement of the point of light, that is, in the direction of the lines, instead of a convex spherical lens there is employed a convex cylindrical lens. Thereby one may employ a single lens for both the purposes mentioned, namely for the enlarging of the lines and also for the rectification of the point of light. There follows automatically an enlargement of the length of lines if for rectification of the light point a convex and not a concave cylindrical lens is chosen. One would however (if one only had in view the rectification of the point of light) in general be inclined to strive to accomplish the object with the thinnest possible cylinder lenses, since these absorb less light and one would consequently choose cylindrical lenses with the greatest possible focus, whereby there would be produced only an inconsiderable increase in the length of the lines. Therefore in the matter of the present invention there is chosen a convex cylindrical lens with the shortest possible focus (and which of course is thicker for that reason) and the distance of the objective is correspondingly changed; whereby without the addition of other convex objectives a sufficient enlargement of the copied distance of the end point of the pitch of the screw slit is obtained and consequently an increased line length is obtained upon the paper.

The device in accordance with the invention makes possible moreover the constant observation of the photographic copying without interrupting the same. In former devices of this kind this observation would take place only very imperfectly, since the observer cannot observe directly the point of light which acts upon the side of the light-sensitive paper, 6, which is turned away from him, but only can observe it feebly shining through the paper while, on removing the paper, 6, the vibrations of the point of light can be easily followed by the eye upon a matte disk attached to the illuminated point, 9. In order now to make it possible that the characters even during the photographic printing can be observed, the screw-shape slit, 14, is lengthened considerably more than one pitch, and thereby at each revolution at predetermined time intervals (or in case the lengthening amounts to one whole pitch, constantly) a second point of light appears, since at definite positions of the rotating cylinder, 13, the filament, 12, can shine through two slit portions onto the mirror and in this way the movement of the mirror, 1, is repeated at the same time by two points of light, the second one of which forms the continuation of the line out over the paper. The matte disk is in this case arranged close to the paper strips and forms the window, 17, which is never covered by the paper, 6, and upon which the second light copy reaching out over the paper becomes visible and allows the operation to be followed without the printing being interrupted so that any disturbance can be immediately recognized and corrected.

The metal cylinder, 13, with the incandescent lamp, 10, is arranged parallel to the oblique direction of the paper strip, 6, which is uniformly pushed forward in the direction of the arrow, 15, so that upon the paper the lines stand forth at uniform distances in the transverse direction; in consequence of the pushing forward of the paper strips the lines however assume an oblique situation. This disadvantage is corrected in accordance with the invention by arranging the filament, 12, of the lamp, 10, somewhat inclined in respect to the direction of the forward movement, 15, of the paper strip.

As a matter of fact the lines hereby appear on the window, 17, in an inclined position, which however, since there is only a question of observation at this point, is not disadvantageous. The relatively inclined position of the incandescent filament can be attained in any desired manner for example by placing the whole lamp, 10, obliquely in the cylinder, 13, in case the filament, 12, is parallel to the tubular axis of the incandescent lamp, or only the filament itself may be stretched obliquely in the interior of the incandescent lamp, in which case the lamp itself must be placed perpendicular to the direction, 15, or only slightly inclined. Also the rotating cylinder, 13, can be arranged obliquely in order to assist the inclined position of the filament 12.

I claim as my invention:—

1. Device for the photographic printing of vibrations in line form by means of a point of light and for the simultaneous observation of the printing, said device including in combination a movable mirror for reflecting a point of light upon a sensitized paper strip, a linear source of light, an opaque rotating cylinder inclosing said source of light and provided with a spiral slit for producing a moving point of light, a convex cylindrical lens between said source of light and said mirror whose focal length is such in proportion to the distance of the mirror that said lens serves to bring into a common plane the boundaries of the point of light lying in different planes and serves also to increase the length of the line.

2. Device for the photographic printing of vibrations in line form by means of a point of light and for the simultaneous observation of the printing, said device including in combination a movable mirror for reflecting a point of light upon a sensitized paper strip, a linear source of light, an opaque rotating cylinder inclosing said source of light and provided with a spiral slit for producing a moving point of light, a cylindrical lens arranged in the course of light between the mirror and the cylinder and adapted to bring into a common plane the boundaries of the point of light lying in different planes, said cylinder having a supplementary spiral-slit portion, a matte screen located outside of the paper strip and coöperating with said supplementary spiral slit so as to permit the appearance of a second vibrating point of light for the purpose of observing the printing.

3. Device for the photographic printing of vibrations in line form by means of a point of light and for the simultaneous observation of the printing, said device including in combination a movable mirror for reflecting a point of light upon a sensitized paper strip, a linear source of light, an opaque rotating cylinder inclosing said source of light and provided with a spiral slit for producing a moving point of light, said source of light being arranged obliquely to the direction of forward movement of the paper strip, in order, in spite of the forward movement of the paper, to obtain lines running perpendicular to the borders of the strip.

In witness whereof, I have hereunto signed my name in the presence of two subscribing witnesses.

ANTON POLLAK.

Witnesses:
HANSON C. COXE,
JOHN BAKER.